Nov. 23, 1926. 1,607,705
P. H. L. TIRANTY ET AL
STAMPING AND REGISTERING OR COUNTING APPARATUS
Filed April 21, 1924   12 Sheets-Sheet 1

Inventors
Philippe H. L. Tiranty
James J. F. Conti
By Henry Orth Jr. atty.

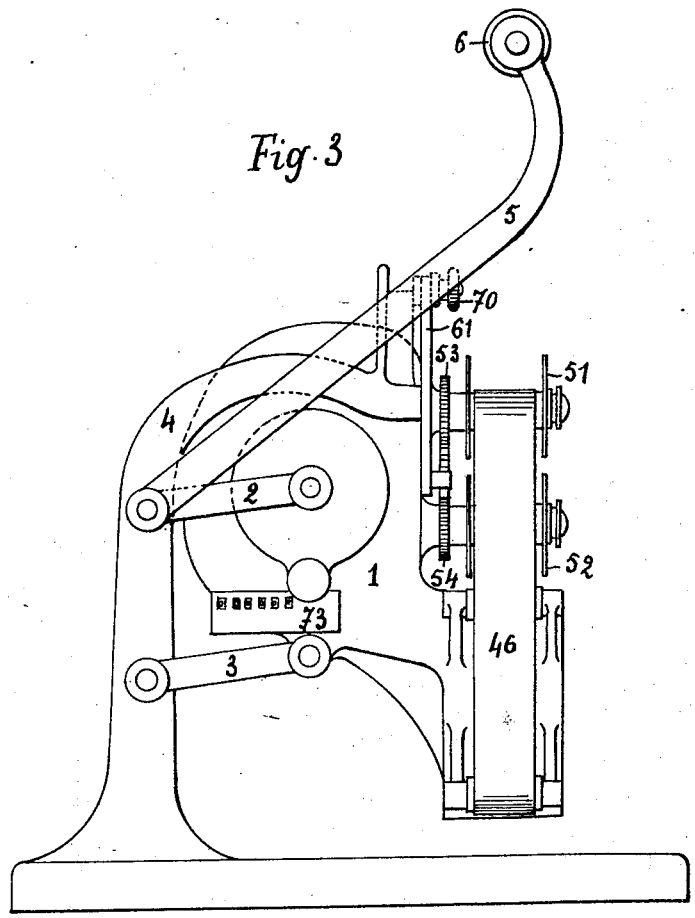

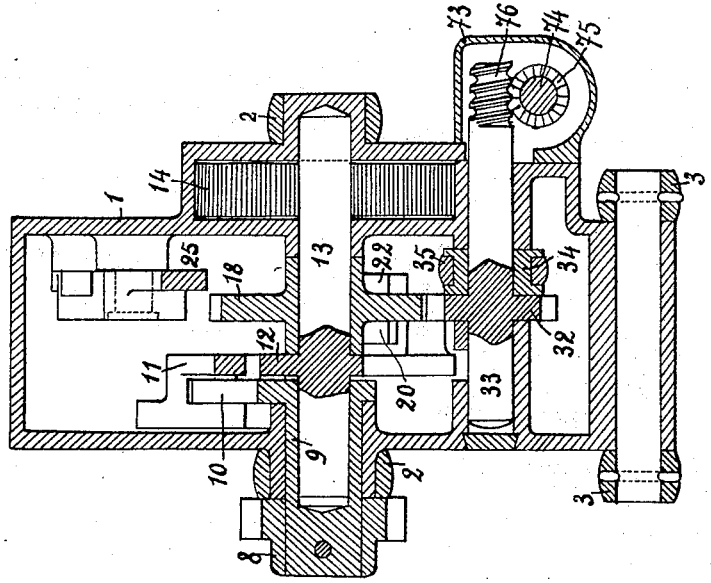
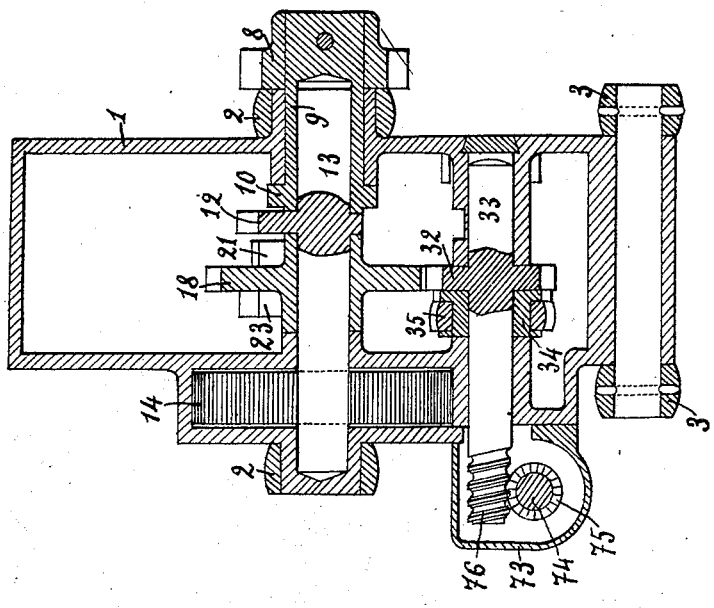

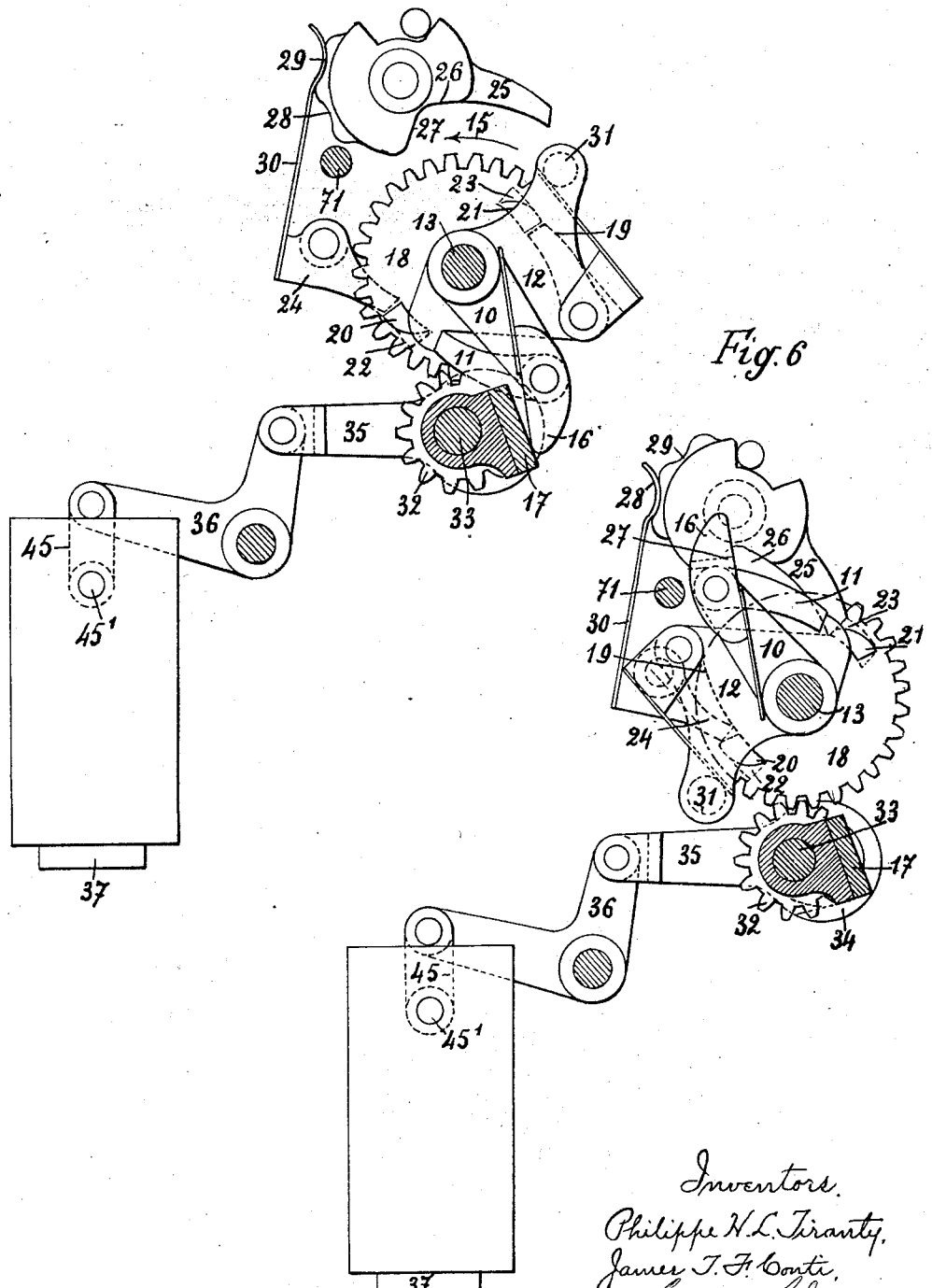

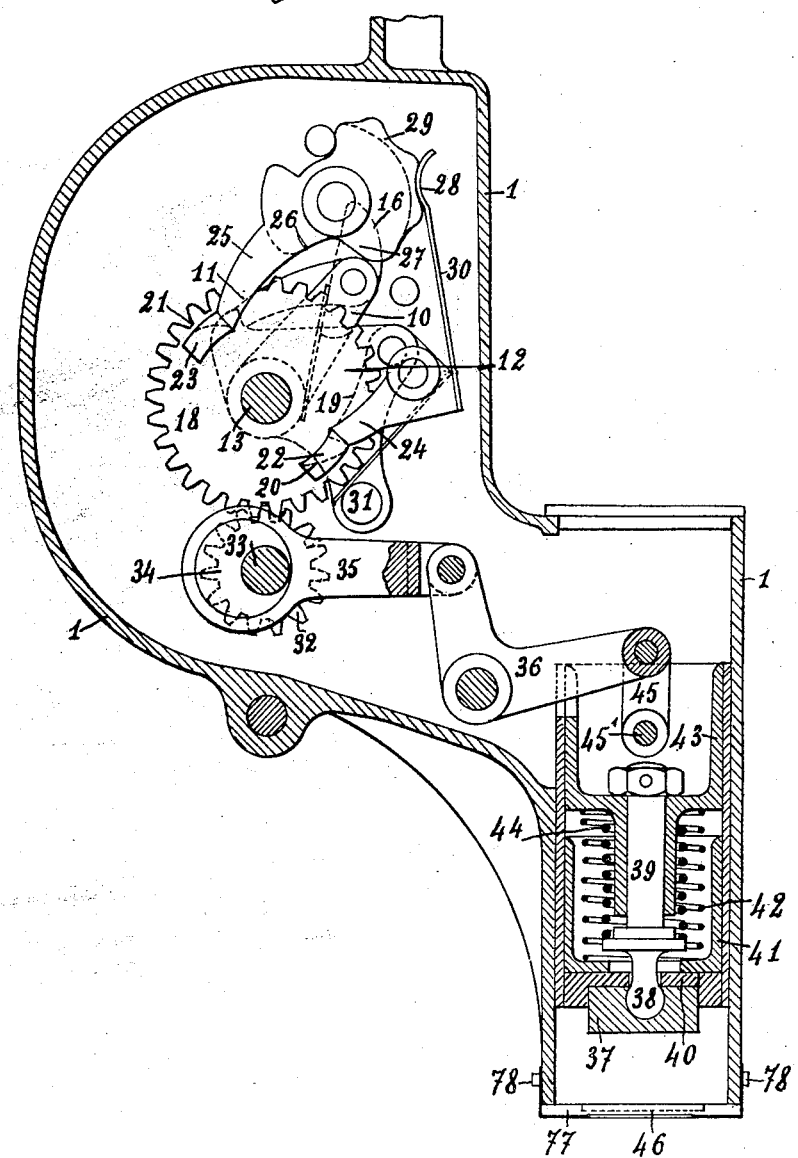

Nov. 23, 1926.                                                1,607,705
P. H. L. TIRANTY ET AL
STAMPING AND REGISTERING OR COUNTING APPARATUS
Filed April 21, 1924        12 Sheets-Sheet 6

Inventors
Philippe H. L. Tiranty
James T. F. Conti.
By Henry Orth         Atty.

Nov. 23, 1926.
1,607,705
P. H. L. TIRANTY ET AL
STAMPING AND REGISTERING OR COUNTING APPARATUS
Filed April 21, 1924   12 Sheets-Sheet 7

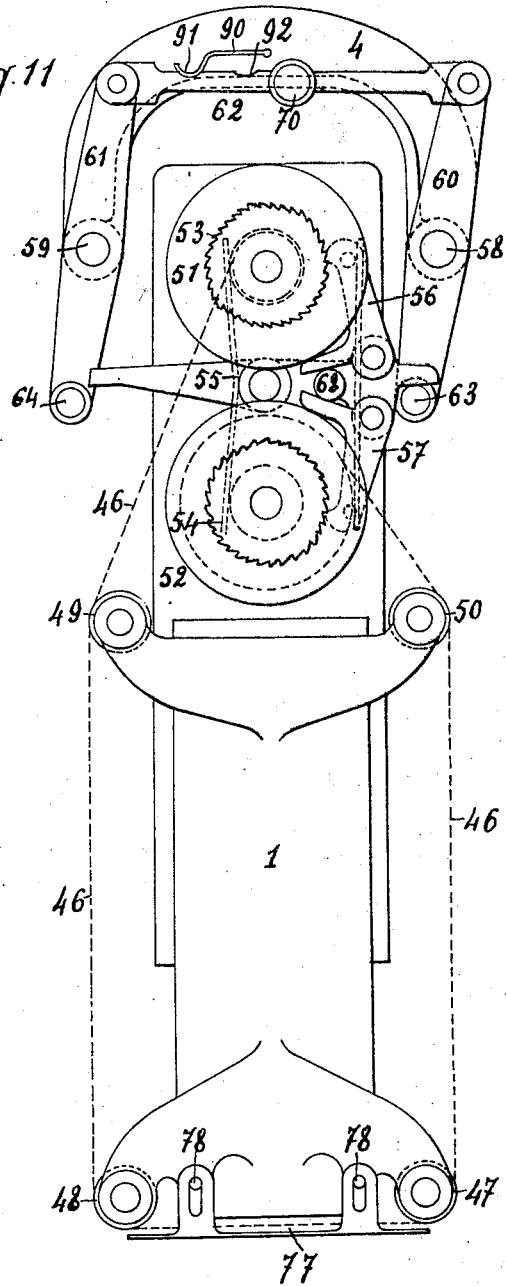

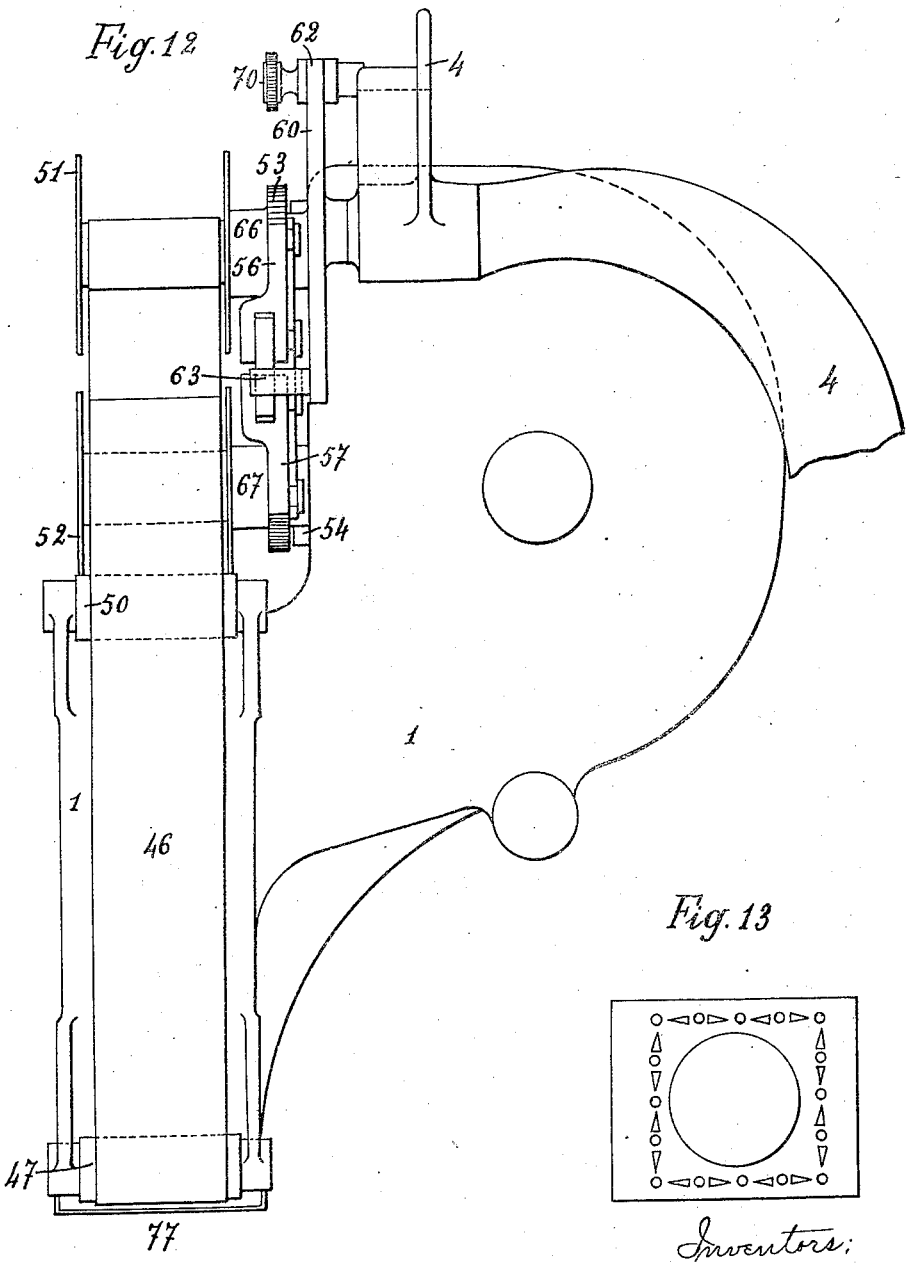
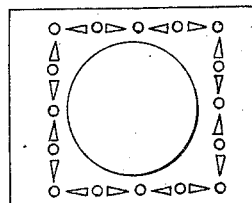

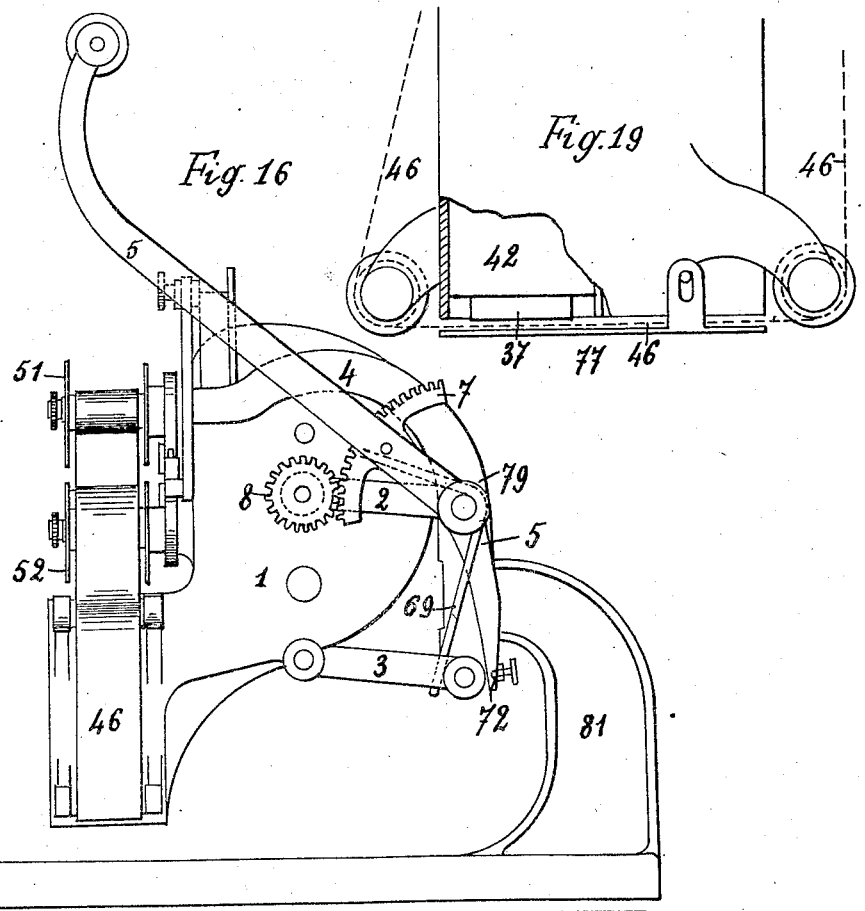

Nov. 23, 1926.

P. H. L. TIRANTY ET AL 1,607,705

STAMPING AND REGISTERING OR COUNTING APPARATUS

Filed April 21, 1924    12 Sheets-Sheet 11

Inventors:
Philippe H. L. Tiranty,
James T. F. Conti
By Henry Orth
Atty

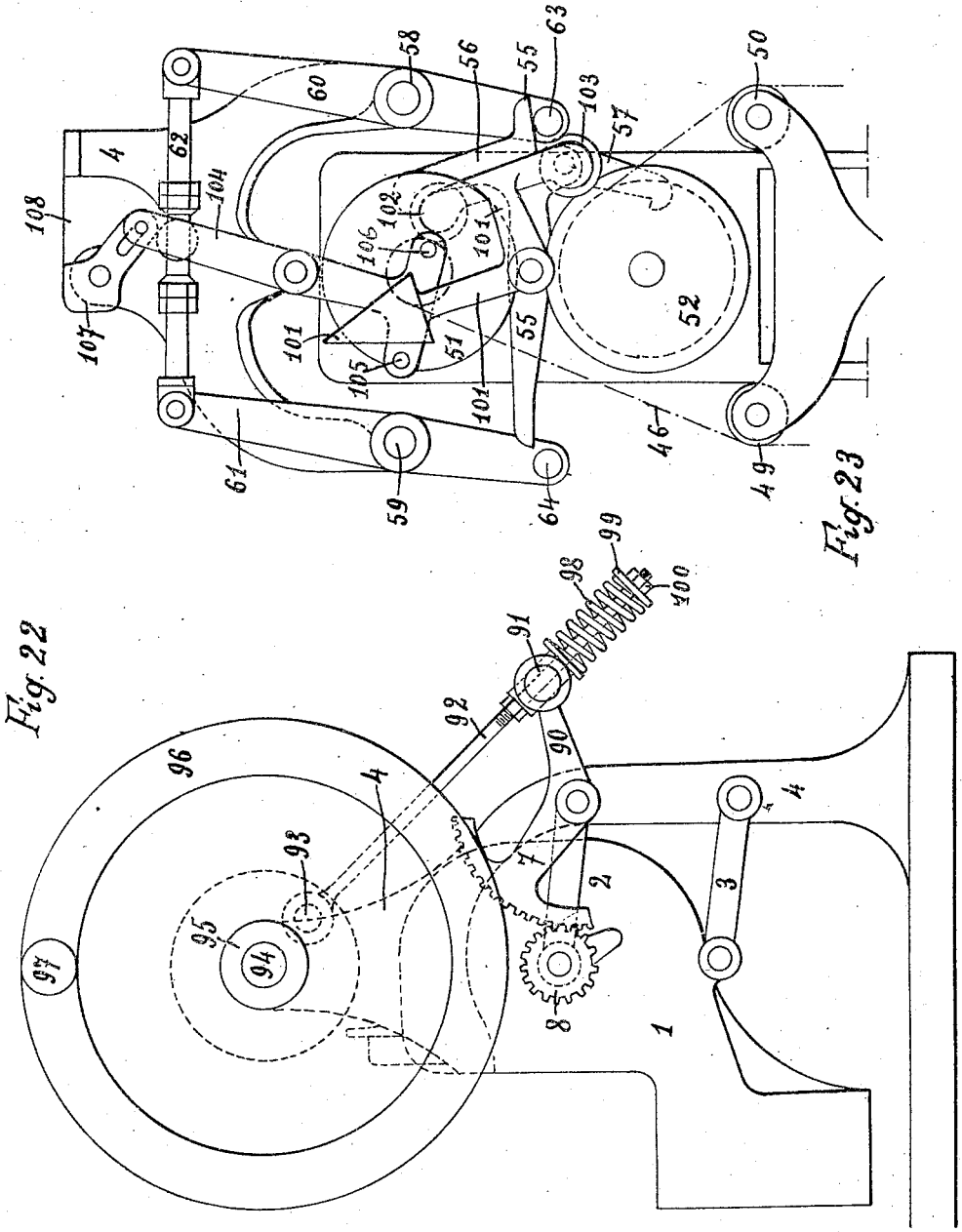

Patented Nov. 23, 1926.

1,607,705

UNITED STATES PATENT OFFICE.

PHILIPPE HENRI LOUIS TIRANTY AND JAMES TIBURCE FELIX CONTI, OF PARIS, FRANCE.

STAMPING AND REGISTERING OR COUNTING APPARATUS.

Application filed April 21, 1924, Serial No. 708,044, and in France April 25, 1923.

This invention relates to a stamping and registering apparatus, which enables stamps, impressions, seals and the like to be produced whilst at the same time registering the number of operations or times that the seal or the like is used.

The apparatus according to the invention comprises essentially an operating mechanism having an oscillating lever adapted to bring the combined or whole device consisting of the stamping system and the actuating system on to the surface to which the stamp is to be applied, with means for operating, through a system of gearing and pawls or the like, one or a plurality of stamps, means being added for feeding forward and inking the ribbon, together with a counter for counting the operations.

The oscillating lever may be operated by a handle or from a crank or the like as hereinafter more fully described.

The apparatus also comprises special constructional arrangements for the purpose of avoiding fraud as to the number of operations effected or stamps supplied.

The invention also refers to the general construction and arrangement of the parts, which permits, with slight alterations the machine to be operated as a unit or in conjunction with several others, and in a continuous manner for stamping a series. It may also be constructed as an automatic distributor or stamping machine operated by the insertion of a coin or token.

In order that the invention may be clearly understood, it will now be described with reference to the accompanying drawings, which however are given merely by way of example, and in which:—

Fig. 3 is a side elevation of the apparatus seen from the left hand side.

Fig. 4 is a section, to a larger scale, of the inner part of the mechanism, the section being taken through the driving spindle and the parts being seen from the front.

Fig. 5 is a view, to a larger scale, of the inner part of the mechanism, the section being taken through the driving spindle the parts being seen from the back.

Figs. 6, 7, 8, 9 and 10, represent the actuating mechanism in various positions.

Fig. 11 shows the arrangement of inking ribbon and the mechanism which controls its rolling, the parts being seen from the front.

Fig. 12 shows the mechanism for operating the rolling of the ribbon, the parts being seen from the side.

Fig. 13 shows a perforated plate coming beneath the inking ribbon.

Figs. 16 and 17 show a modification of the supporting framework for the apparatus.

Fig. 19 is a detail view showing the stamp with the front parts broken away or removed.

Fig. 22 shows an apparatus controlled by means of a crank.

Fig. 23 shows the automatic operating means for reversing the drive of the inking ribbon.

Figure 2:
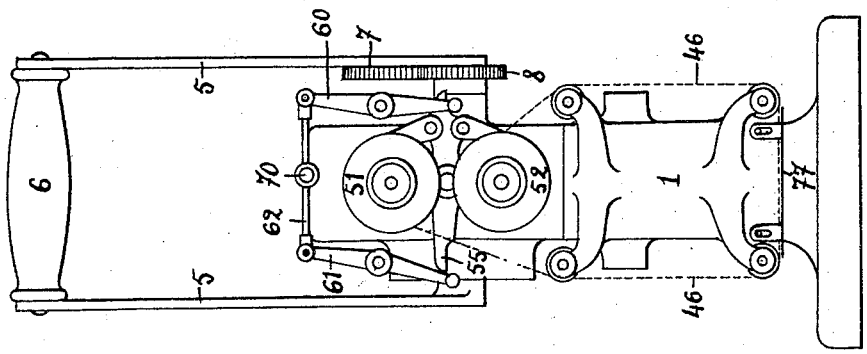
Fig. 2 is a front view of the same apparatus.
Figure 1:
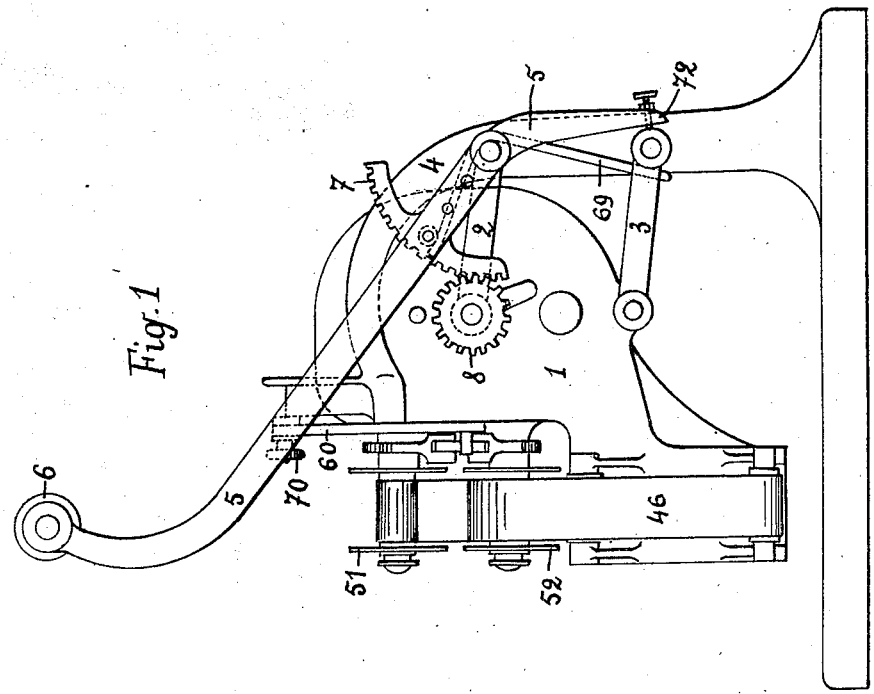
Fig. 1 is a diagrammatic side view of the apparatus seen from the right hand.
Figure 9:
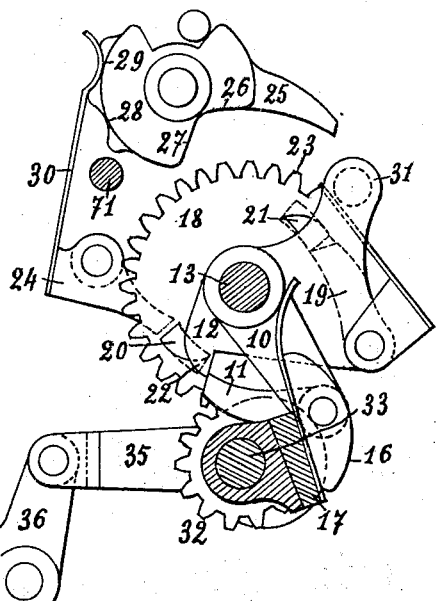

Referring to Figs. 1, 2 and 3, the apparatus comprises a casing 1, suspended by pairs or hinged links or their equivalents 2 and 3 from a base plate and main framework 4. On the pivotal axis of the link 2 is mounted an oscillating lever 5 provided with a handle 6. This lever is pushed constantly upwards by a strong spring 69, which tends to keep the adjusting or set screw on the tail 72 of the lever against an abutment on the main framework. The lever 5 carries a toothed sector 7 in engagement with a gear wheel 8 which actuates the inner mechanism.

This mechanism, which is represented in Figs. 4 to 10, comprises the following parts.

8 is the gear wheel already mentioned, which is fixed upon a tube 9 (see Figs. 4 and 5) integral with a piece 10 to which corresponds an abutment 71.

On the piece 10 (see Figs. 4, 5, 6, 8, 9, 10) is mounted a pawl 11, which engages a notch formed in a piece 12 integral with an operating spindle 13 (Figs. 4–10).

14 is a volute spring (Figs. 4 and 5) which causes the spindle 13 and consequently the piece 12 to turn in a counter clockwise direction, which direction is indicated by an arrow 15, Fig. 8. The lowering of the lever 5 causes through the toothed sector 7, the wheel 8, the piece 10 and the pawl 11 to turn the part 12 in a clockwise direction, until the tail 16 of the pawl 11 strikes against the projection 17 (Figs. 6, 8, 9 and 10) whereupon the pawl 11 (Fig. 9) is rocked over and the piece 12 being liberated comes under the action of the spring 14 and returns to its initial or rest position, as at Fig. 6.

On the piece 12 is pivotally mounted a pawl 19 (Figs. 6–10) coming alternately into engagement with one or other of two studs or blocks 20 and 21 diametrically opposite to one another or in connection with the gear wheel 18. When the piece 12 passes from the position indicated at Fig. 6 to that shown at Fig. 8, the pawl 19 comes into engagement with the stud or block 21, whilst when the piece 12 returns to the original position indicated at Fig. 6, the pawl 19 turns the wheel through a half revolution. At the following stroke or operation, it will come into engagement with the stud or block 20 which will come into the place of the stud or block 21; and so on.

In order to lock the wheel 18 after each of these displacements, there is provided on the other face of the said wheel another pair of blocks or studs 22 and 23. A counter pawl 24 comes alternately into engagement with one or other of these blocks and prevents all rotation in a direction opposite to the arrow 15.

In order to avoid the piece 12 in its return movement turning through more than half a revolution under the action of the spring 14, and so turning with it the wheel 18, another pawl 25 is provided which is adapted to stop this wheel at the desired moment, coming alternately in front of the blocks 22 and 23. This last pawl must obviously only function to limit the return movement of the piece 12, for if it remained always in engagement with one of the blocks (Fig. 6), it would prevent the wheel 18 from turning under the action of the pawl 19 when the piece 12 returns to the starting position. Consequently the pawl in question must rise to allow one of the blocks or studs to pass, for instance the block 23, and must then be lowered to come against the other block, for instance the block 22. In order to effect this the pawl 25 is provided with a cam surface (Figs. 6 to 10) having two working surfaces 26 and 27, and two notches 28 and 29 in which the curved extremity of a spring 30 is adapted to engage, the other extremity of which spring is attached to the pawl 24. This spring controls at the same time the pawls 24 and 25. A finger or roller 31 disposed on the piece 12 rides over the surfaces 26 and 27, in such a way as to raise, at the forward stroke, the pawl 25 (Figs. 8 and 9) and to lower it at the return stroke. It is retained in each of the two positions by the spring 30 engaging the notch 29 and then the notch 28, and so on.

The gear wheel 18 is in engagement with the pinion 32, the diameter of which is half that of the wheel. Under these conditions, each time the wheel 18 makes a half revolution, the pinion 32 makes a complete revolution. This pinion is keyed to a spindle 33 carrying an eccentric 34 (Figs. 4, 5 and 7) the strap 35 of which is connected to a bent lever 36 operating, through a piston 43, the controlling stem 39 of a stamp 37 located in the casing 1. The lever 36 operates a connecting rod 45 in such a way that a spindle $45^1$ mounted on the said connecting rod reciprocates the hollow piston 43 located in the casing 1.

On the base of this piston is carried a powerful spring 44, one end bearing against the underside of the piston and the other end pressing on a shoulder or projection on the stem 39 for operating the stamp. This spring moves the stamp when the piston 43 descends and is compressed at the moment of stamping. The stamp is mounted in such a way as to ensure a good impression even upon a slightly inclined surface. With this object in view the engraved portion for producing the stamp forms part of a piece 37 into which enters a pin 38 with an enlarged head at the end of the rod 39, constituting a sort of ball joint.

A bearing plate 40 conveniently made in two parts in close juxtaposition keeps the stamp in position under the pin and is carried by a hollow piston 41 upon the interior of which is a weak spring 42, the upper end of which rests against the base of the piston 43.

It will be seen that with this method of mounting the stamp, it can take up a slightly inclined position in any direction, but that it always returns to its normal position under the action of the spring 42.

The stamping is effected, as already indicated, by the application of the engraved surface 37 to the surface to be stamped.

To ensure the inking of the stamp in an automatic manner, an inking ribbon 46 guided by rollers, 47, 48, 49, 50, Figs. 11 and 12, passes under the stamp, its ends rolling upon two reels 51 and 52 such reels being attached by strong frictional engagement to the spindles upon which they are mounted.

The ribbon is operated by an automatic mechanism which is brought into action at each stamping operation through the displacement of the apparatus with respect to the basic or main framework 4.

Figure 14:
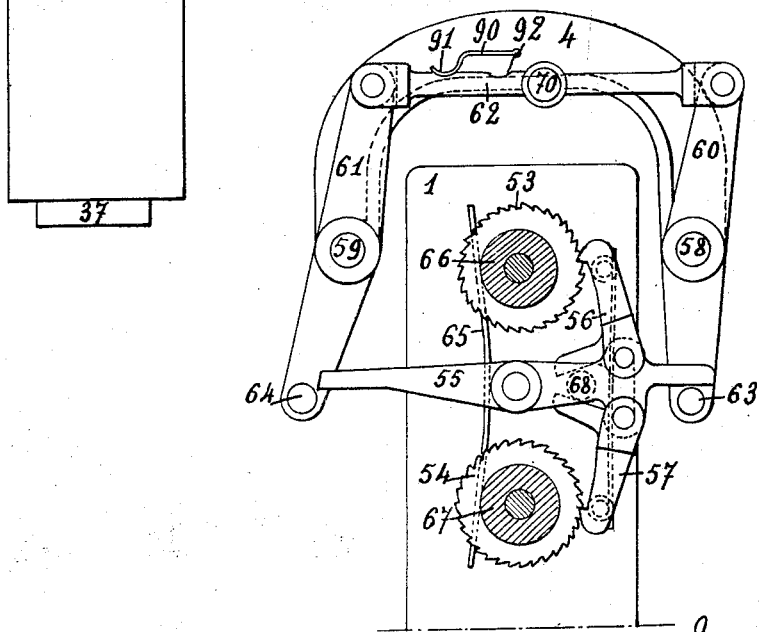
Figs. 14 and 15 show the driving means for the inking ribbon.
Figure 10:
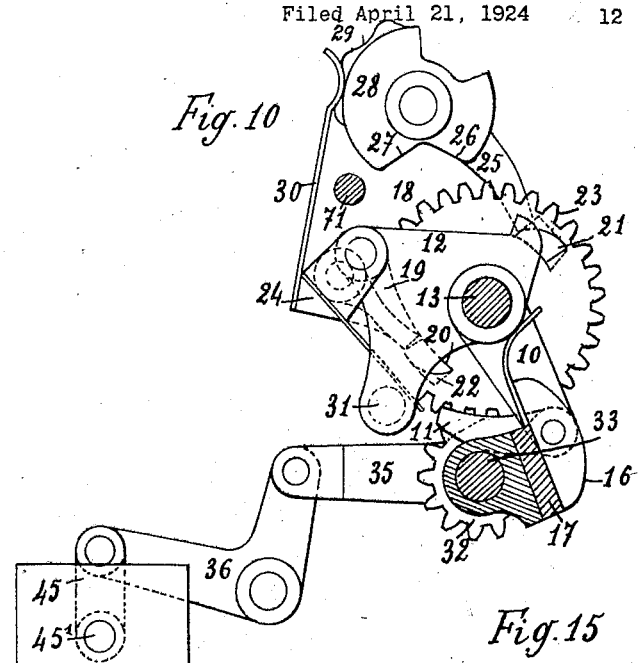

The mechanism in question comprises, in addition to the two reels 51 and 52 already mentioned, two ratchet wheels 53 and 54 integral with these wheels and mounted on their respective spindles. A lever 55 (Figs. 2, 11, 14 and 15) carries two pawls 56 and 57 engaging these ratchet wheels and adapted to rest against a pin 68 mounted on the lever. This latter carries in addition a leaf spring 65, the extremities of which are adapted to rest against the hubs 66 and 67 on the spindles of the reels. Two fixed pins 58 and 59 on the basic framework or standard 4 carry two arms 60 and 61 connected by a transverse connecting rod 62 which can be pushed to the left with respect to the position illustrated at Fig. 14, by means of a knob or button 70. An appropriate arrangement, such as for instance the spring 90 engaging in one of two notches 91 and 92 keeps the connecting rod 62 in one or other of its extreme positions.

The operation of the connecting rod 62 can be obtained automatically by utilizing for this purpose the variation in diameter of the reels according to the rolling of the ribbon.

Fig. 23 shows by way of example an arrangement which may be utilized to effect this operation. On the extension of the spindle of the lever 55 is mounted a bent lever 101 carrying at one extremity which is bent into the shape of a T, two small rollers 102 and 103 adapted to rest on the wound ribbon.

With this arrangement, the lever 101 will slope to the right or the left according to whether one or other of the wheels has the greater diameter. This movement is utilized for oscillating in one direction or the other a lever 104 movable upon a spindle on the basic framework and having two blocks 105 and 106 for this purpose. The lever 104 acts directly upon the connecting rod 62 by engaging between suitably adjusted projections on the said connecting rod. A lever 107 retained and operating at the end of the stroke by a spring rapidly completes the movement commenced by the lever 101.

The arms 60 and 61 carry at their lower ends studs or blocks 63 and 64. By displacing the boss 70 and consequently the connecting rod 62, one or other of these blocks engages under one extremity of the lever 55.

Each printing operation effected by the apparatus is registered by a revolution counter of an ordinary type, shown at Fig. 3. The operation of this counter is effected in the following manner.

The units drum is rigidly connected to a spindle 74 (Figs. 4 and 5) having a gear wheel 75 provided with 10 teeth and constantly in engagement with a worm 76 provided on the driving spindle 33. As each operation causes the pinion 32 to turn, and consequently the spindle 33 through a complete revolution, it follows that each time the counter is moved through one tenth of a revolution, that is through unity.

The operation of the apparatus just described is as follows:—

The document or piece to be stamped is placed under the casing 1, in such a way that the stamp can be produced in a suitable position when the lever 5 is lowered by the handle 6.

The operation of the handle has various consequences which for the sake of convenience will be described separately, and which are the following.

The first consequence is the lowering of the casing 1 and its application upon the surface to be stamped and the setting of the mechanism for moving forward the ribbon.

The operation of the mechanism for the stamping takes place at the bottom of the stroke of the lever and at the same time there is the declutching of the mechanism for lowering and raising the stamp and the operation of the counter.

When the handle 6 of the lever 5 is operated, then through the sector 7, the wheel 8 is turned and this latter is under the control of the spring 14. The operation of the lever has for its first effect to cause the casing 1 to descend until contact is made with the surface to be stamped. After this the sector 7 turns the wheel 8, since the base 4 is firmly supported with the operating table and cannot tilt. The wheel 8 in turning moves the piece 10, and through the intervention of the pawl 11, the piece 12 is operated. The spring 14 is put under stress and the pawl 19 comes into engagement with the block 21. Moreover the finger 31 engaging on the cam 26 raises the pawl 25, which is retained in its new position by the spring 30, the extremity of which has come into the notch 29 (see Figs. 8, 9 and 10).

If the force applied to the handle 6 is continued the tail 16 of the pawl 11 which is brought against the projection 17 causes the liberation of the piece 12 which is under the action of the spring 14. On its return to the original position, it moves, through the intervention of the pawl 19, the wheel 18; and at this moment, the finger 31 operates the cam 27 and lowers the pawl 25; this pawl comes in front of the block 20 and stops the rotation of the wheel 18. It will be understood that under those conditions the pawl 25 disappears or moves away when its presence might interfere with the passage of the first block, but that it returns to its place directly after the passage and so soon as it is necessary to close the path of the next following block and to stop it. The stoppage takes place when the wheel 18 has turned through a half revolution the result being that the pinion 32 and the spindle 33 are turned through a complete revolution. The worm 76 on the spindle acts on the gear wheel 75 and causes it to turn through a single tooth, which causes the counter to turn through unity. On the other hand the excentric 34 operated by the movement of rotation of the pinion 32 (Fig. 7) displaces the strap 35, operates the lever 36, the piston 43, etc., through the intervention of the spring 44, the controlling stem 39 of the stamp 37, which is applied to the piece to be stamped and then rises as the excentric 34 continues its rotation, withdrawing the piston 43. The stamp therefore performs a complete reciprocating movement at each escapement of the part 12. When the stamping has been effected, the handle 6 is released. The spring 69 comes into operation on the lever 5 and causes it to rise and consequently the sector 7 causes the wheel 8 to turn. This wheel moves the piece 10, which, as has been seen is integral therewith, until the pawl 11 has passed the notch in the piece 12 which has come into place under the action of the spring 14. Continuing the movement, the piece 10 abuts against the block 71 fixed to the casing 1. The wheel cannot turn further and all pull of the spring 69 is exerted to raise the casing 1 until the tail 72 of the lever 5 comes against the stop and limits the movement. By regulating the set screw on the tail 72, the height of the casing 1 with respect to the table at the rest position can be varied at will.

At the same time that the movement of descent and of ascent of the casing 1 is produced, the operation of the inking ribbon is effected. As a matter of fact, during the descending movement of the casing 1 (Fig. 15) the lever 55 in connection with this casing rests on the finger 63, which forms a portion of the mechanism 60, 61, 62 in connection with the basic framework 4 and is therefore immovable with respect to the casing and the lever 55. The pawl 56 mounts on the ratchet wheel 53 whilst the pawl 57 supported by the pin 68 leaves the ratchet wheel 54 and the spring 65 integral with the lever 55 is stressed against the hub 67.

The stamping is effected, and the casing 1, as has been seen rises. The lever 55 is then under the action of the spring 65 and tends to come into the horizontal position. This rotary movement of the lever causes the ratchet 53 to turn under the action of the pawl 56, causing the ribbon to be advanced and a fresh portion to come under the stamp.

The apparatus is now ready for a fresh operation.

Figure 15:
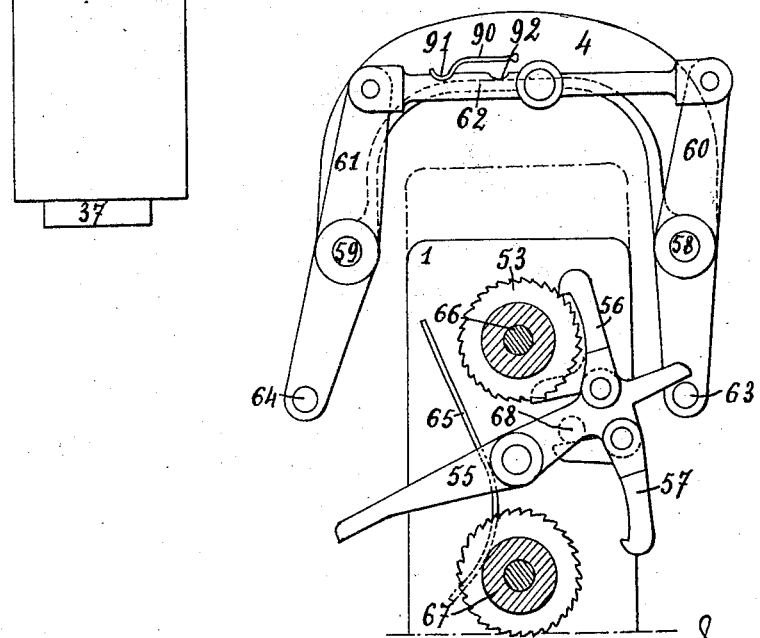

When the reel 52 on which the ribbon is wound is full and consequently the reel 51 is empty, it is sufficient to press upon the connecting rod 62 and to move towards the left making use of the projection or button 70, substituting the block 64 for the block 63, the lever 55 will be rocked over in the direction opposite to that shown in Fig. 15, and would cause the rolling of the ribbon on to the reel 51 and its unrolling from the reel 52.

The general operation of the apparatus having been indicated, different arrangements will now be described which may be adjusted to prevent fraud.

In the first place, by examination of Fig. 7, it will be seen that the mechanism operating the stamp and the stamp itself are always inaccessible and enclosed in the casing 1. The stamp, in particular, is at such a height in this casing that access thereto is impossible. Moreover a complete reciprocating movement takes place during a very short period and the stamp cannot be used for a number of times, the operation being effected by simple declutching.

In the second place, provision has been made to guard against the case in which, by placing two separate sheets with a carbon between them, under the stamp, it might be sought fraudulently to obtain two impressions.

To guard against this there is fixed under the casing 1 a very thin metal sheet 77 which may be carried from four loops 78, see Fig. 11. This sheet is cut to allow the stamp to pass and is provided with a series of openings of suitable shape intended to form a frame around the stamp, as shown by way of example at Fig. 13.

When under the action of the handle 6, the casing 1 is pressed on to the paper or the like to be stamped the inking ribbon is applied to the plate 77, if necessary with the interposition of a plastic washer or cushion placed under the casing 1. The frame constituted by the perforated plate is thus impressed on the paper. It is however impossible to obtain a second depression with the carbon, because this latter would give a negative impression which would be easily recognizable.

In place of perforated plates, an interchangeable plate may be provided having in the cut away portion the date. Moreover, in order not to have to change the plate there may be provided at the corners of the latter horizontal discs which may be of very thin metal and which may be adapted to come into position in front of appropriate orifices in the plate 77 and to show numbers according to the date.

Finally in order to prevent access to the counter from the outside, its mechanism is enclosed in a sealed casing shown at Fig. 3.

To prevent forgers stamping their papers and then manipulating the apparatus until the counter returns to zero, the counter is provided with a large number of numerical places. It is quite evident that if the counter has for instance 7 drums, it would be necessary to perform 9,999,999 stamping operations before the return to zero. This would represent several months of continuous work. Of course the reading of the counter should be taken at suitable intervals, every month for instance.

This combination of precautionary measures renders therefore all fraud impossible, and the apparatus as described, is certain in operation and is sufficient in itself. However, in order to adapt it for more extensive uses, certain improvements and modifications may be introduced.

Figure 20:
Fig. 20 shows an impression obtained with two stamps.
Figure 18:
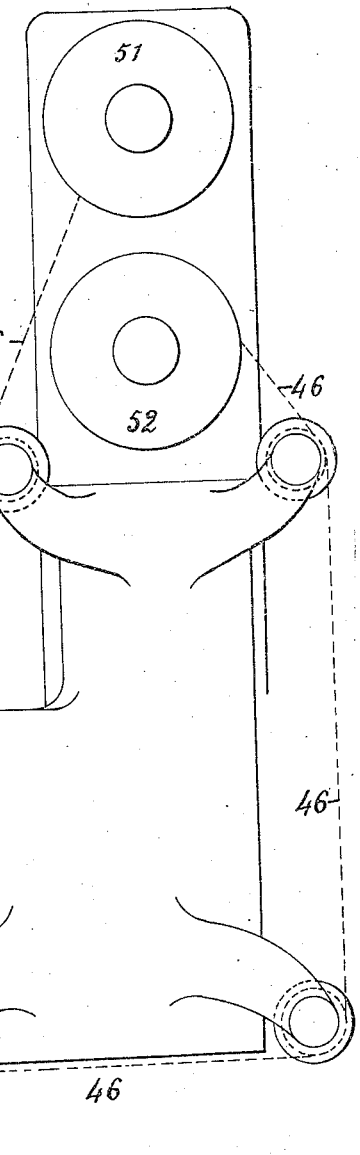
Fig. 18 is a front view of the apparatus with a supplementary stamp located on the left hand side.

For instance, it may be desirable to obtain, at the same time, as the impression which cannot be interfered with another impression which may not necessarily be computed in the counter, and which would only be provided for instance as an ordinary number, the date and hour of stamping or some other indication of interest, see Fig. 20.

With this object in view at the side of the casing 1 there is provided a seal or stamp mounted in the same way as the first mentioned but upon a piston fixed to the casing 1 and slightly projecting therefrom. The inking ribbon may pass under the second seal as shown at Fig. 19. This seal may be accessible and removable so as to permit the date to be changed.

It has been seen in the preceding description that the casing 1 is supported by two hinged rectangular link systems on the fixed basic framework 4. In order to give greater mobility to the apparatus a framework such as that represented at Figs. 16 and 17 may be provided. This comprises a part 79 carried by a vertical axis from the end of a frame 80, which latter is hinged to a fixed socket 81. This arrangement permits a given surface to be stamped in various places by simply moving the apparatus upon its support.

Figure 21:
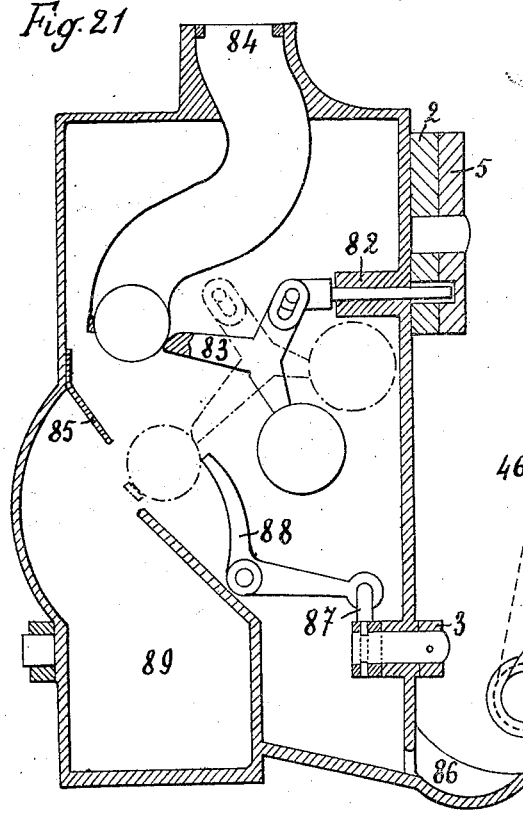
Fig. 21 shows diagrammatically an automatically operating mechanism adapted to be freed by means of a coin.

If it is desired to provide an apparatus which works automatically on the introduction of a coin, the coin freed mechanism shown at Fig. 21 may be adopted.

The operating lever 5 is, under normal conditions locked with respect to the arm 2 by means of a catch 82 adapted to engage in orifices provided for the purpose in the parts.

This catch is operated by a lever 83 which is bent and furnished with a counterbalance weight. It terminates in a thin frame having a diameter very slightly less than that of the selected coin. On the other hand, the orifice 84 for the introduction of the coin is of a diameter precisely equal to that of the piece of money. Consequently if a coin of lesser diameter is introduced into the opening, it will pass into the machine and knock against a projection 85 and come out through the opening 86 so that it could be recovered.

If, on the other hand, the coin is of the desired diameter it will be stopped by the frame and will rock over the lever 83, which will withdraw the catch 82. In this way the lever 5 controls and operates the stamping. When the operation is accomplished the frame 3 rises, the lever 87 integral with the frame operates on a bent lever 88 which pushes the piece into the box 89 for the money. The lever 83 under the action of the counterpoise weight returns to its original position forcing the catch into its recess.

In what precedes it has been assumed that the apparatus is operated by a handle moving from above downwards. Fig. 22 shows a modification in which the apparatus is operated by a crank. As will be seen on that figure, the sector 7 is in this case extended into a bent arm 90 terminating in a pivotal joint 91, through which is adapted to slide a stem 92 controlled by a crank stud 93 connected to the spindle 94, which is operated from the other side of the plate 95 by a wheel 96 and handle 97. A spring 98 presses on the one hand on the joint 91, whilst the other end rests on a washer 99 kept in position by a nut 100 screwing on to the rod 92.

A simple inspection of Fig. 22 will show that the operation is the same as when the sector 7 is connected to an oscillating lever. The spring 98 has no other purpose except that it is adapted to be compressed when the thickness of the piece to be stamped increases.

This arrangement, as shown at Fig. 22, permits a plurality of apparatus to be easily coupled together on the same base plate, each apparatus being operated in succession by the same handle. To obtain this result, it is sufficient to replace each fly wheel by a gear wheel and to provide a single supplementary squared spindle, operated for instance by a handle with a sliding clutching gear adapted to be put into engagement with a clutch for each apparatus.

The recording and stamping apparatus just described possesses many advantages. It is strong, simple in operation, certain, absolutely protected from fraud by the special arrangements of the counter and the stamp.

The applications to the apparatus are numerous. It would enable so called vignetting stamps to be done away with whilst ensuring for the State a rigid control of the postal service. The sealed apparatus can be examined periodically, and the reading of the counter will indicate the number of stamping operations effected and consequently the amount of revenue to be collected.

The apparatus will also be of use in all cases in which seals are to be attached of importance either from the point of view of fiscal authorities, such as notaries, bailiffs, registrars or the like: from the point of view of administrative authorities, such as ministers, mayors and the like, or in connection with seals or signatures binding on corporations, banks, limited companies, etc.

The constructional embodiments above described are given merely by way of example, as the forms, dimensions and materials employed may be varied in all cases without departing from the principle of the invention.

Having thus described our invention, what we claim is:—

1. In a stamping mechanism, a framework, a casing, stamping and counting mechanism carried by said casing, pivoted links supporting said casing on the frame, a prime operating member mounted on said frame, stamp actuating mechanism inclosed within said casing, and means operated by said member to simultaneously depress said casing and operate said stamping mechanism, and inking mechanism carried by and bodily movable with said casing.

2. A stamping and counting apparatus comprising a basic framework, a casing mounted on the said framework and containing the stamping and counting mechanisms, pivoted links carrying the said casing from the basic framework, an oscillating handle, a toothed sector operated by the said handle, a pinion engaged with the toothed sector, and appropriate means actuated by the pinion to operate the stamp and ribbon inking mechanism carried by and bodily movable with said casing.

3. A stamping and counting apparatus comprising a basic framework, a casing mounted on the said framework and containing the stamping and counting mechanisms, pivoted links carrying the said casing from the basic framework, an oscillating handle, a toothed sector operated by said handle, a pinion engaged with the toothed sector, a spring stressed by the sector, a system of pawls adapted to release the said spring, a spindle connected to said pawls, an excentric on the said spindle actuating the stamp to apply the latter to the surface to be stamped and to raise the said stamp as soon as the stamping has been effected.

4. A stamping and counting apparatus comprising a basic framework, a casing mounted on the said framework, a counting mechanism in said casing, a stamping mechanism mounted by means of a universal joint in said casing, a spring member to draw back the stamp in its normal position, an oscillating lever to depress the casing onto the piece to be stamped and pivoted links carrying the said casing from the basic framework.

5. A stamping and counting apparatus comprising a basic framework, a casing mounted on the said framework, a counting mechanism in said casing, a stamp carried by a piston slidable in a suitable cylinder in the casing, means to depress the stamp on to the piece to be stamped, pivoted links carrying the said casing from the basic framework, and an oscillating lever adapted to bring the casing on to the surface to be stamped.

6. A stamping and counting apparatus comprising a basic framework, a casing mounted on the said framework, a stamping and a counting mechanism in said casing, an oscillating handle and gearing with a spindle to depress the stamp on to the piece to be stamped, a worm on the said spindle and means operated by the said worm to actuate the counter, and pivoted links carrying the said casing from the basic framework.

7. A stamping and counting apparatus comprising a basic framework, a casing mounted on the said framework, stamping and counting mechanisms in said casing, a movable ribbon to ink the stamp, two ribbon drums, pivoted links carrying the said casing from the basic framework, an oscillating lever adapted to bring the casing on to the surface to be stamped, means in connection with the oscillating lever to wind the ribbon on to and off one or the other of two drums, and means to reverse the direction of winding of the ribbon.

8. A stamping and counting apparatus comprising a basic framework, a casing mounted on the said framework, stamping and counting mechanisms in said casing, a movable ribbon to ink the stamp, a perforated frame of thin metal adapted to present openings of determined size opposite to the inking ribbon, pivoted links carrying the said casing from the basic framework, an oscillating lever adapted to bring the casing on to the piece to be stamped, and means controlled by said oscillating lever to wind or unwind the inking ribbon.

9. A stamping and counting apparatus comprising a basic framework, a casing mounted on said framework and containing the stamping and counting mechanism, means to depress the casing onto the piece to be stamped, pivoted links carrying the said casing from the basic framework, an oscillating handle, a toothed sector operated by the said handle, a pinion engaged with the toothed sector, means actuated by the pinion to operate the stamp and a movable ribbon to ink the stamp.

10. In a stamping mechanism, a framework, a movable casing, stamping and counter operating mechanisms inclosed in said casing, pivoted links supporting the casing on the frame, a prime operating member mounted on said frame, means operated by said member to actuate the stamping mechanism and project it from the casing into operating position during the movement of said casing, said counter-operating mechanism operated from the stamp actuating mechanism during the movement of said casing.

In testimony that we claim the foregoing as our invention, we have signed our names.

PHILIPPE HENRI LOUIS TIRANTY.
JAMES TIBURCE FELIX CONTI.